(12) United States Patent
Center, Jr. et al.

(10) Patent No.: US 6,680,745 B2
(45) Date of Patent: Jan. 20, 2004

(54) VIDEOCONFERENCING METHOD WITH TRACKING OF FACE AND DYNAMIC BANDWIDTH ALLOCATION

(75) Inventors: Julian L. Center, Jr., Andover, MA (US); Christopher R. Wren, Cambridge, MA (US)

(73) Assignee: Perceptive Network Technologies, Inc., Kingston, NH (US)

( * ) Notice: Subject to any disclaimer, the term of this patent is extended or adjusted under 35 U.S.C. 154(b) by 0 days.

(21) Appl. No.: 10/012,096

(22) Filed: Nov. 13, 2001

(65) Prior Publication Data

US 2002/0113862 A1 Aug. 22, 2002

Related U.S. Application Data

(60) Provisional application No. 60/247,142, filed on Nov. 10, 2000.

(51) Int. Cl.[7] .................................................. H04N 7/14
(52) U.S. Cl. ................................. 348/14.16; 348/14.08; 348/169
(58) Field of Search .......................... 348/14.01–14.09, 348/14.1, 14.11–14.13, 14.16, 169; 382/274, 178, 108; 270/260, 261

(56) References Cited

U.S. PATENT DOCUMENTS 5,434,617 A * 7/1995 Bianchi ....................... 348/169

6,091,777 A * 7/2000 Guetz et al. ................. 375/240
6,297,846 B1 * 10/2001 Edanami ..................... 348/14.07

FOREIGN PATENT DOCUMENTS

JP          409284791 A  * 10/1997  ............ H04N/9/30

* cited by examiner

Primary Examiner—Melur Ramakrishnaiah
(74) Attorney, Agent, or Firm—Ware, Fressola, Van Der Sluys & Adolphson LLP; Milton Oliver (57) ABSTRACT

A videoconferencing method automatically detects, within an image generated by a camera, locations and relative sizes of faces. Based upon the detection, a control system tracks each face and keeps a camera pointed at and focused on each face, regardless of movement about a room or other space. Preferably, multiple cameras are used, and an automatic algorithm selects a best face image and resizes the face image to substantially fill a transmitted frame. Preferably, an image encoding algorithm adjusts encoding parameters to match a currently amount of bandwidth available from a transmission network. Brightness, contrast, and color balance are automatically adjusted. As a result of these automatic adjustments, participants in a video conference have freedom to move around, yet remain visible and audible to other participants.

5 Claims, 13 Drawing Sheets

Figure 1

Hardware Configuration for Multiple View Analysis

Conceptual View of an Image Pyramid

Signal Flow for Template Matching

Figure 8

Signal Flow for Background Differencing

Figure 9

Signal Flow for Background Image Update

Figure 10

Signal Flow for Computing Foreground

VIDEOCONFERENCING METHOD WITH TRACKING OF FACE AND DYNAMIC BANDWIDTH ALLOCATION

CROSS REFERENCE TO RELATED APPLICATION

This non-provisional application claims the benefit of prior provisional application Ser. No. 60/247,142, filed Nov. 10, 2000.

FIELD OF THE INVENTION

The present invention relates generally to videoconferencing and, more particularly, to the use of image recognition technology to track the faces of conference participants, thereby freeing them to move about, yet stay within camera range, and facilitating preferential allocation of bandwidth to a face portion of each video frame.

BACKGROUND

Most prior art videoconferencing systems transmit video images from a single camera, e.g. mounted on top of a computer monitor of each participant. These cameras use a "landscape" format (i.e. width dimension greater than height dimension), similar to a television set, and the system transmits the entire image. Due to the fact that typically only a limited amount of bandwidth is available, only a low-resolution image, e.g. 160 by 120 pixels, is transmitted. As a result, the user must sit relatively still, and in a position fairly close to the camera to be able to transmit a good face image. Furthermore, the automatic gain control (AGC) of the camera, which controls brightness and contrast of the image, is often controlled by simple averaging methods that do not account for the location of the face in the image.

SUMMARY OF THE INVENTION

Therefore, it is an object of the present invention to use automatic face recognition algorithms to distinguish a face portion of an image from other portions of the image, and to track any movement of the face around the room or other space in which the participant is located. This tracking can be used to automatically focus, zoom and pan the camera or, in case multiple cameras are available, to automatically switch from one camera to another, as appropriate. The camera parameter adjustments such as color balance or automatic gain control can be programmed to satisfy pre-determined criteria, e.g. best lighting for reading facial expressions, or enhancement of the transmitting person's appearance by simulating a suntan. For applications requiring identification of a person, the camera can be directed to zoom in on known distinguishing characteristics of each particular person until identification has been made. If the number of persons in a room varies during a conference, the image can be adjusted to show all who are present at a particular time or, if desired, to omit observers who do not wish to be seen.

Figure 1:
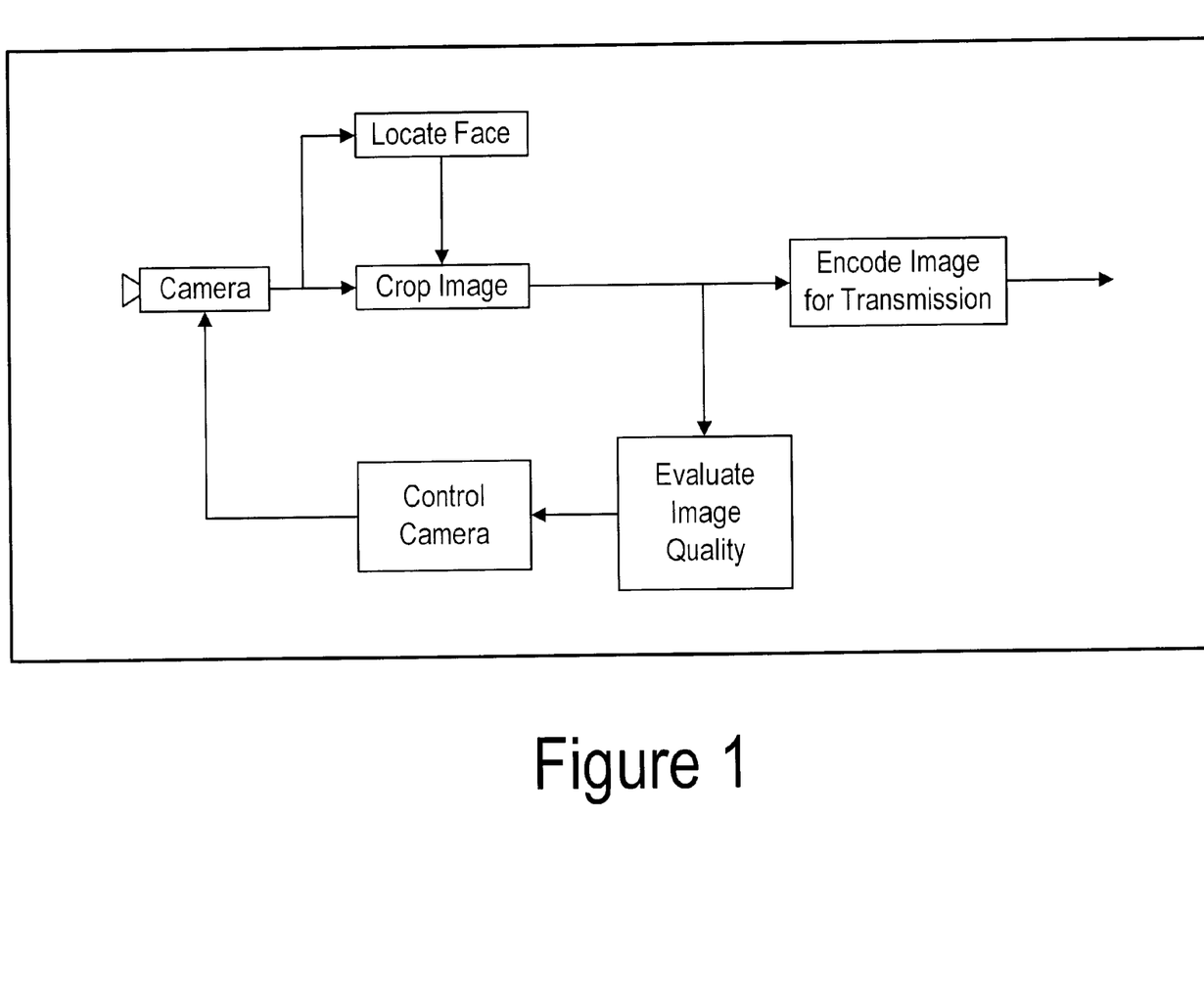
FIG. 1 is a schematic diagram showing a feedback loop in which results of evaluation of image quality are used to generate commands for control of the camera and any other image processing elements, e.g. an image editing or cropping stage.

DETAILED DESCRIPTION OF THE PREFERRED EMBODIMENT:

FIG. 1 shows the basic structure for improving videoconferencing with a single camera. An algorithm, implemented in either hardware or software, analyzes the incoming video image to determine the location and relative size of the face image. One feasible algorithm is described in Turk and Pentland (U.S. Pat. No. 5,164,992 & Reissue 36,041).

This information is used to crop the image to a portrait shape (i.e. height dimension greater than width dimension) that excludes uninteresting portions of the image. This cropped portion of the image is resized to maintain a face image approximately the same size at all times. This smaller cropped image is encoded for transmission. Because the image is smaller than the original image and is stabilized relative to the face, it inherently requires less bandwidth to transmit than an image, a third or more of which is background. Face images are generally taller than they are wide, so frames in "landscape" format will inherently have a larger fraction of their pixels devoted to background than frames in "portrait" format have. In addition, specialized encoding methods tailored to compressing face images can be used to further reduce the required bandwidth, or conversely to improve the quality of the received image within established bandwidth constraints.

Knowledge of the face location allows a feedback loop to improve the quality of the incoming face image. The face image in the current video frame is evaluated and this information is used to adjust the camera brightness, contrast, and color balance to produce a good face image in succeeding video frames. Because the system tracks the user and crops the image appropriately, the user can move more freely in front of the camera without degrading the quality of the face image at the receiver.

Figure 2:
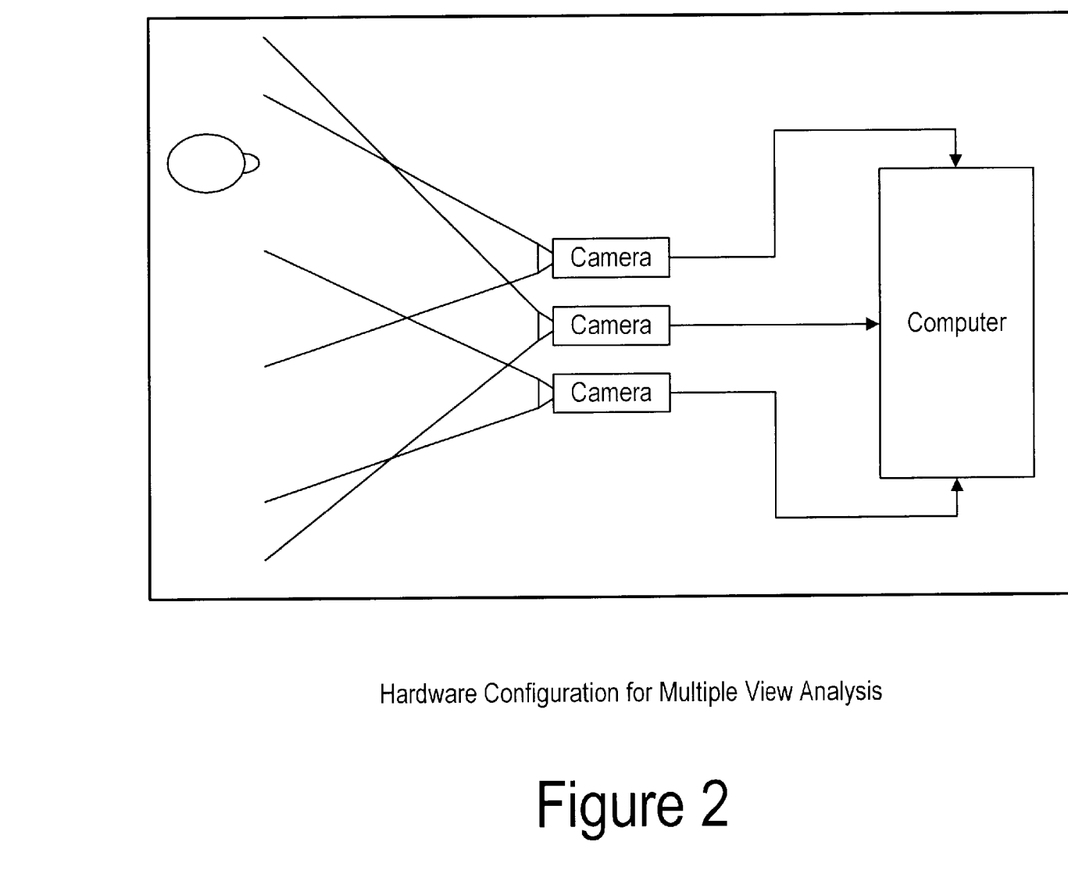
FIG. 2 is a diagram showing how multiple cameras can be used to provide high-quality face images over a wide field of view, allowing more freedom of movement for each videoconference participant.

Even more freedom of movement and higher quality face images can be achieved by employing multiple cameras. FIG. 2 illustrates a typical arrangement of three cameras on top of a monitor. In this example, the middle camera has a wide-angle lens that covers the entire field of view of the system. The two outer cameras have narrower fields of view, but can get higher quality images of subjects farther from the system.

Figure 3:
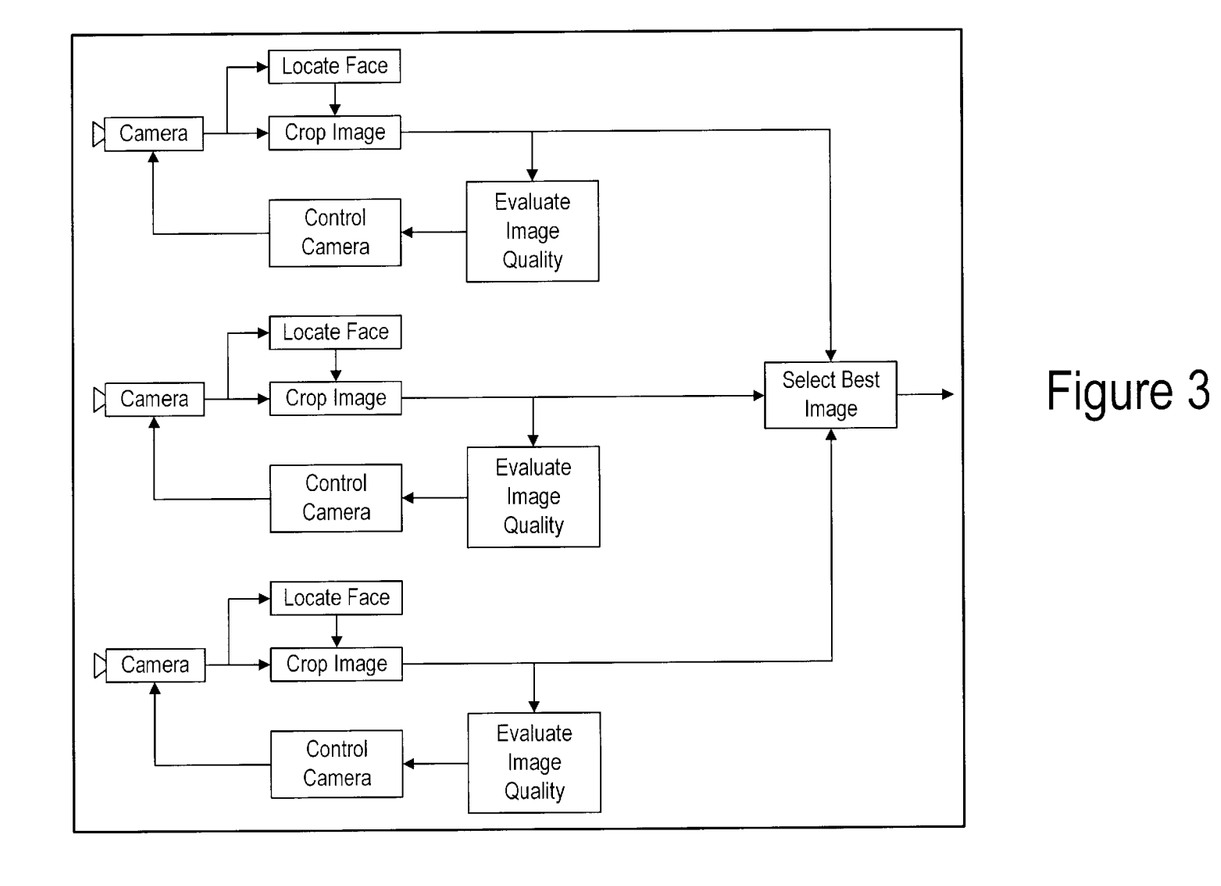
FIG. 3 is a diagram showing how separate control loops are used to select a best face image for each camera independently, and to select, from among the images produced by multiple cameras, a best image to be transmitted to other conference participants.

Signals from each of these cameras are fed to some combination of software and hardware that implements an algorithm for selecting the best face image for transmission. FIG. 3 illustrates one form of this algorithm. In that figure, the basic image control loop of FIG. 1 is implemented independently for each camera. The results are fed to an algorithm that evaluates the quality of each face image and chooses the best for transmission.

Figure 4:
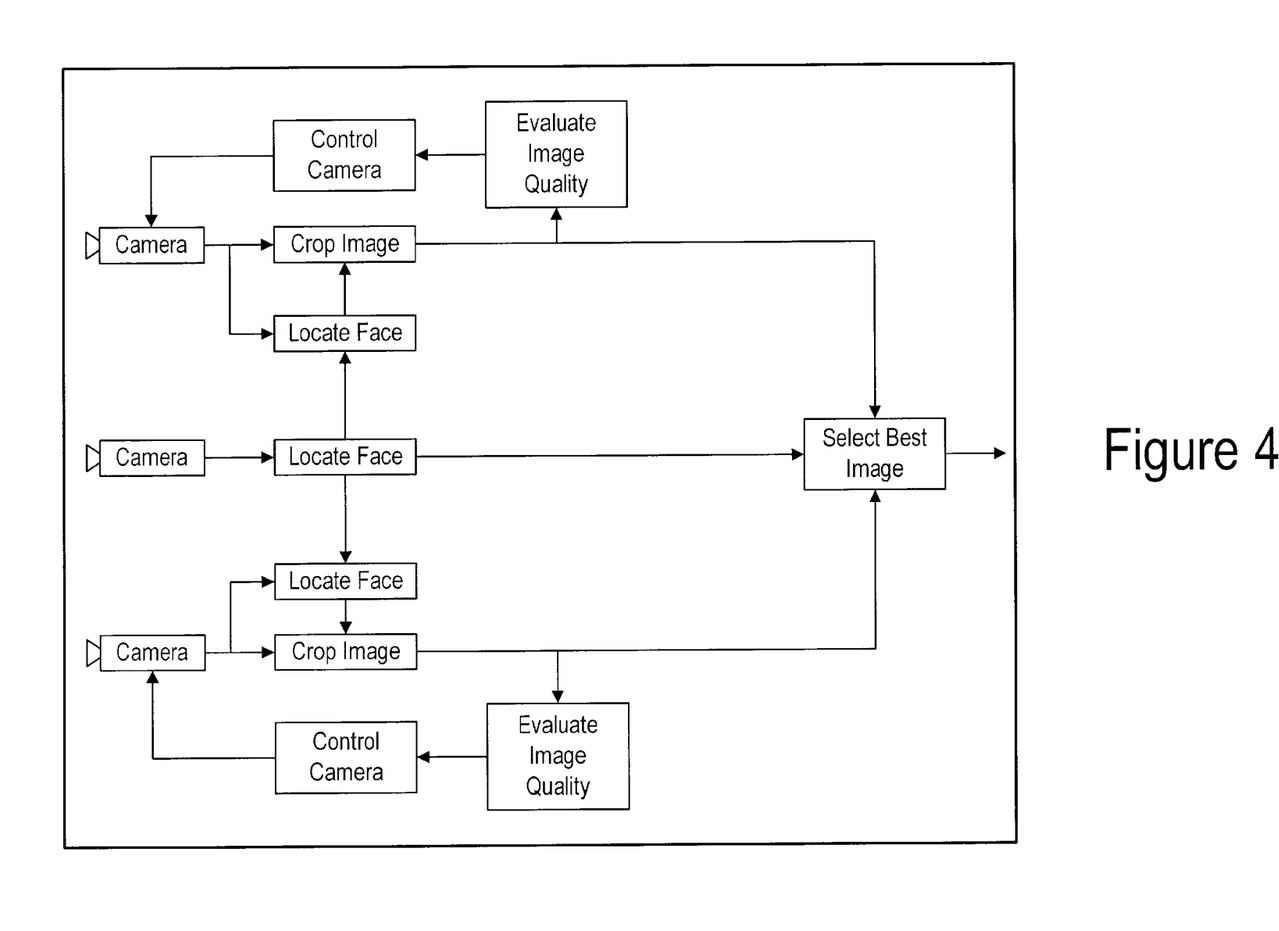
FIG. 4 is a diagram showing how a wide-angle camera can be used to locate faces within a wide field of view, and to aid in controlling the pan, tilt & zoom of more narrowly focused cameras.

FIG. 4 illustrates a variation where the center camera is used only for control. This wide-angle camera is used to locate the face (or faces) in the field of view. This face location information is fed to the algorithms that locate faces in the images from the other cameras and to the switching algorithm that selects the best image. With this type of configuration a fixed wide-angle camera could be used to assist in controlling the pan, tilt, and zoom of movable cameras.

Locating human faces is performed by applying a combination of template matching, motion detection, background differencing, and color analysis to the video streams. Each of these methods will be described in detail below.

Figure 5:
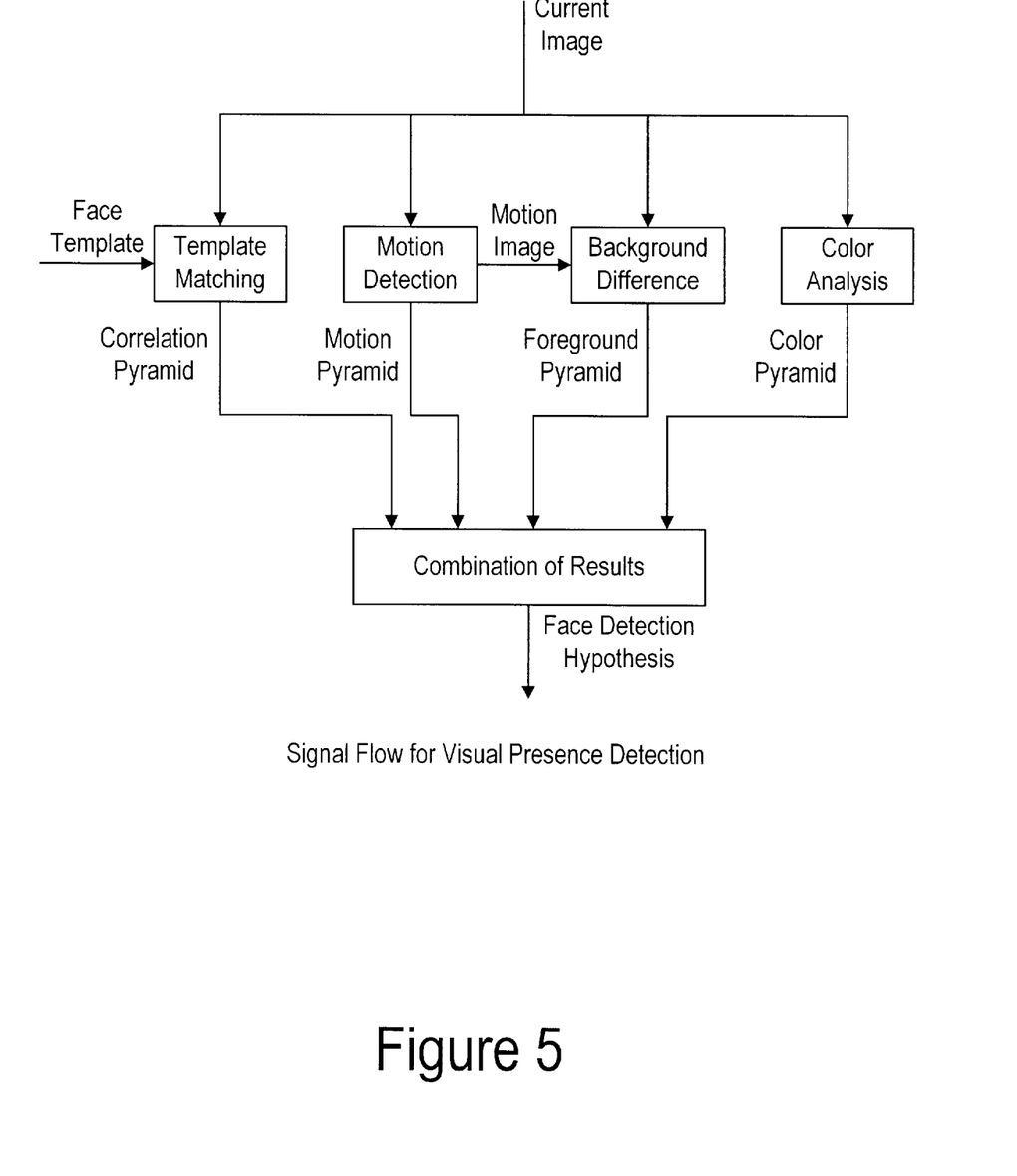
FIG. 5 is a diagram of the signal flow for visual presence detection.

The signal flow of visual presence detection is illustrated in FIG. 5. The methods are performed by respective subroutines which operate on a common set of data structures stored in random access memory under a series of variable names including currentImage, motionImage, motionPyramid, correlationPyramid, foreground Pyramid, and colorPyramid. The arrival of a new frame of video (currentImage) triggers a processing pass through these subroutines. The results of a processing pass are stored in a set of face detection hypotheses. Each hypothesis consists of a location and scale for a possible face image and a probability number indicating the likelihood that a face of that size is located at that location.

Video Acquisition

The first step in visual detection is to acquire the image stream. In the preferred embodiment, a stream of images is gathered, using an inexpensive camera attached to the Universal Serial Bus (USB) of a Personal Computer (PC) running the Microsoft Windows 2000 operating system. Standard Windows Driver Model (WDM) methods [cf. Water Oney, "Programming the Microsoft Windows Driver Model" (Microsoft Press, Redmond, Wash.) (1999) are used to bring individual frames of the video sequence into a storage area, called currentImage, in Random Access Memory when requested by the downstream processing. The camera driver is configured to deliver the image in YUV format (cf. p. 104, Philip E. Mattison, "Practical Digital Video with Programming Examples in C" (John Wiley & Sons, Inc., New York N.Y.) (1994). In this format, each pixel of the image is represented by three 8-bit numbers, called channels. The color information is contained in the U and V channels, and the intensity ("black and white") information is contained in the Y channel. The processing for visual detection works on the image stream as a continuous flow of information and produces a continuous stream detection hypotheses. To control the amount of processing resources consumed by this algorithm, a software timer is used to control the number of frames per second that are fed from the camera. Typically, 15 frames per second are processed.

Template Matching

Figure 8:
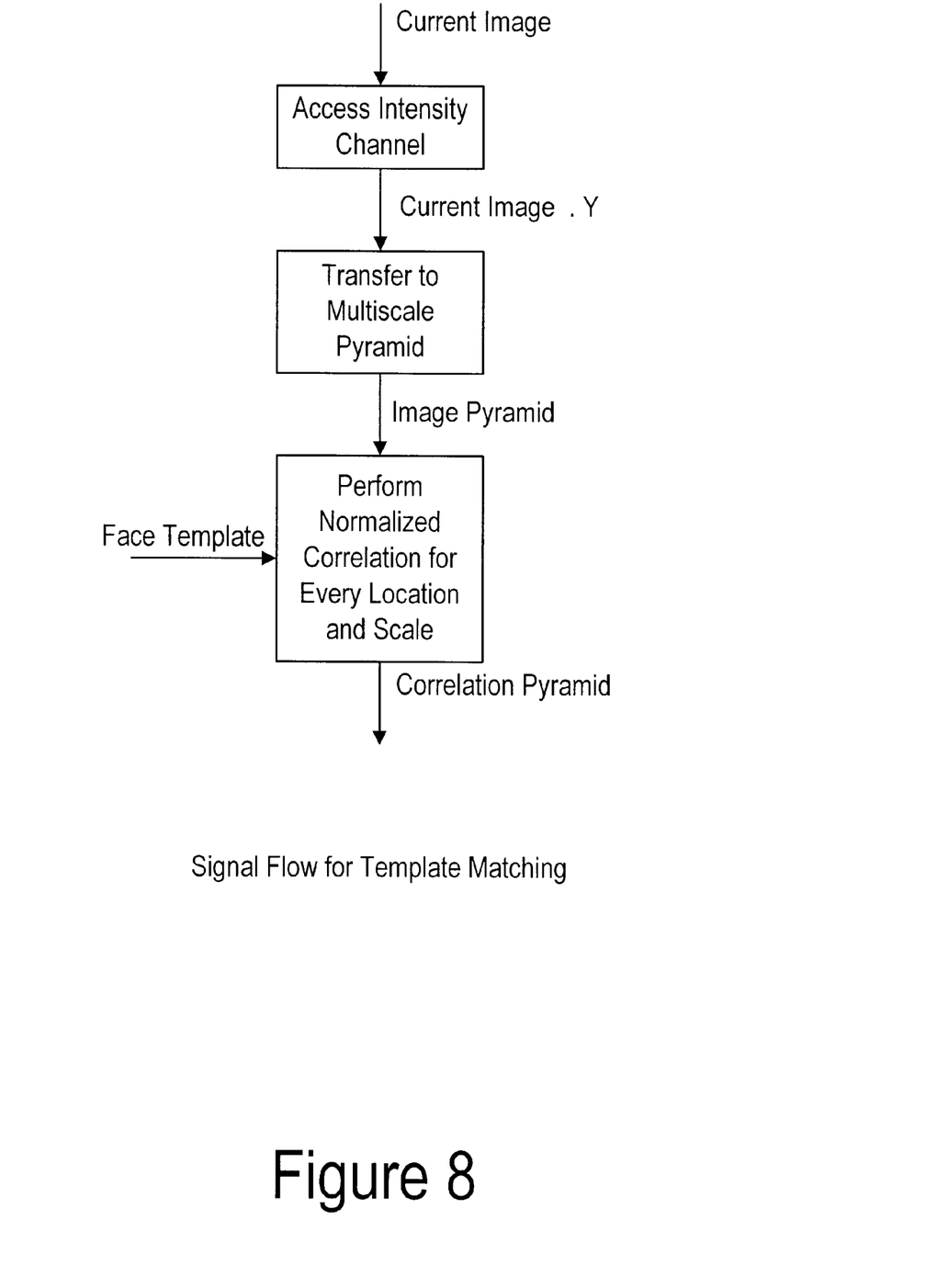
FIG. 8 is a diagram of the signal flow for matching an image to a template.

FIG. 8 shows the signal flow for template matching. Template matching involves searching the intensity channel of the image for a section (patch) that is similar to a reference image (template) of the same size. The template represents the expected appearance of the object being sought. A number of templates may be used to represent all of the variations in appearance of the object. To search for a face, templates that represent the range of appearance of the types of faces sought are used. To minimize the computational load, the preferred embodiment uses a single template derived by averaging a large population of face images. If desired, greater detection accuracy can be achieved at the cost of a greater computational load by using multiple templates. Furthermore, the detection algorithm can be tuned to recognize a particular user by selecting templates that match the range of appearance of that user.

The degree of similarity of the patch to the template is measured by the normalized cross-correlation of their intensities (cf. p. 317, Robert M. Haralick and Linda G. Shapiro, "Computer and Robot Vision, Volume II," (Addison-Wesley Publishing Company, Inc., Reading, Mass.) (1993) and p. 482, Ramesh Jain, Rangachar Kasturi, and Brian G. Schunck, "Machine Vision," (McGraw-Hill, Inc., New York, N.Y.), (1995)). To implement normalized correlation, first the template is normalized to have zero mean and unit variance. That is, the mean of the all the pixels in the template is computed and subtracted from every pixel, and then the square root of the variance of the pixels is computed and used to divide every pixel. Similarly, the patch is normalized to have zero mean and unit variance. The normalized cross correlation is then computed by averaging the products of the corresponding pixels of the normalized template and the normalized patch. The result will always lie between −1.0 and 1.0, with 1.0 representing a perfect match.

Since the location of the face is initially unknown, the algorithm examines every possible shift of the template relative to the image. The algorithm organizes the results of all of these correlations by storing them in a two-dimensional, floating-point array, which can be thought of as a floating-point image and is called a correlation map. The value stored in particular location of the correlation map is the result of the normalized cross-correlation of the template and a patch centered at the corresponding location of the image.

Because the size of the face image may also vary, a multi-scale search must be performed. This could be accomplished by using several templates of varying sizes; however, a more efficient method is to keep the template size the same and rescale the image. By shrinking the image and keeping the template the same size, the algorithm can search for a larger face in the original image.

Figure 6:
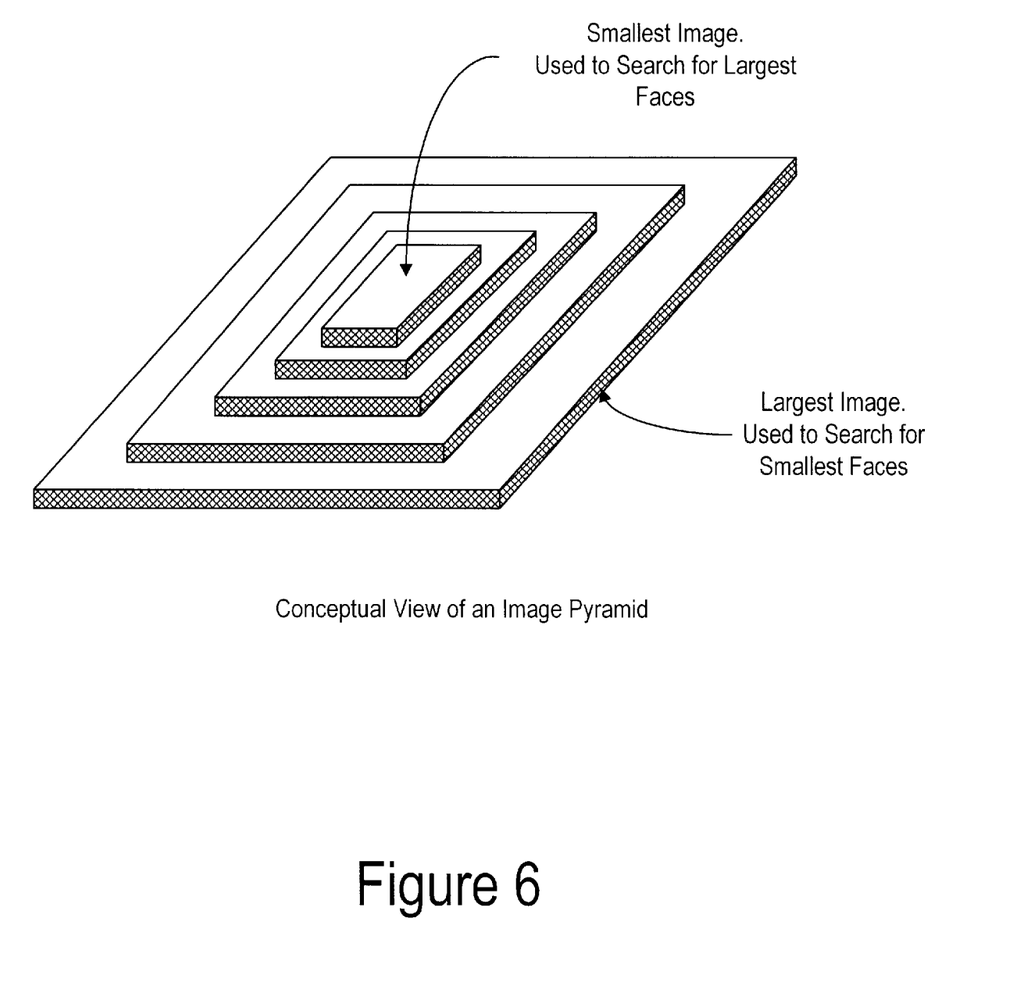
FIG. 6 is a conceptual view of an image pyramid.

To organize this process, the algorithm uses image pyramids. FIG. 6 illustrates the concept of an image pyramid. An image pyramid is a sequence of images where each image is slightly smaller than the previous one in the sequence. It is called a pyramid because, if you imagine the images as being stacked on top of one another, they would look like a pyramid. Each image in the pyramid is called a layer. Usually, the ratio of dimensions of one layer of the pyramid to those of the previous layer is a constant value. In the preferred embodiment, this ratio is 0.9. In conjunction with this ratio, the number of layers in the pyramid determines the range of face sizes that can be found with a single template. The preferred embodiment uses seven layers. This supports searching for face sizes that can vary by as much as a factor of two.

To search for faces of varying sizes, the algorithm maps the intensity values (Y channel) of the incoming image onto a pyramid of smaller images. Call this pyramid inputPyramid. The algorithm computes the value for a pixel (target pixel) in one of the layers of inputPyramid (target layer) by averaging pixels in a rectangle in the incoming image. The dimensions of this averaging rectangle are determined by the ratio of the dimensions of the incoming image to the corresponding dimensions of the target layer. The center of the averaging rectangle is determined by scaling the coordinates of the target pixel by these same dimension ratios.

Next, the algorithm uses the template to compute a "correlation map" for each layer. These correlation maps are stored in a floating-point image pyramid called correlationPyramid. The number of layers in correlationPyramid is the same as in inputPyramid, and the dimensions of corresponding layers in these two pyramids match.

The result of these calculations is an "image" pyramid, correlationPyramid, where each pixel in the corresponds to the similarity the template to a patch of a particular size (scale) and at a particular location in the input image. A value near 1.0 indicates that a face is likely to be at that scale and location.

Motion Detection

Figure 7:
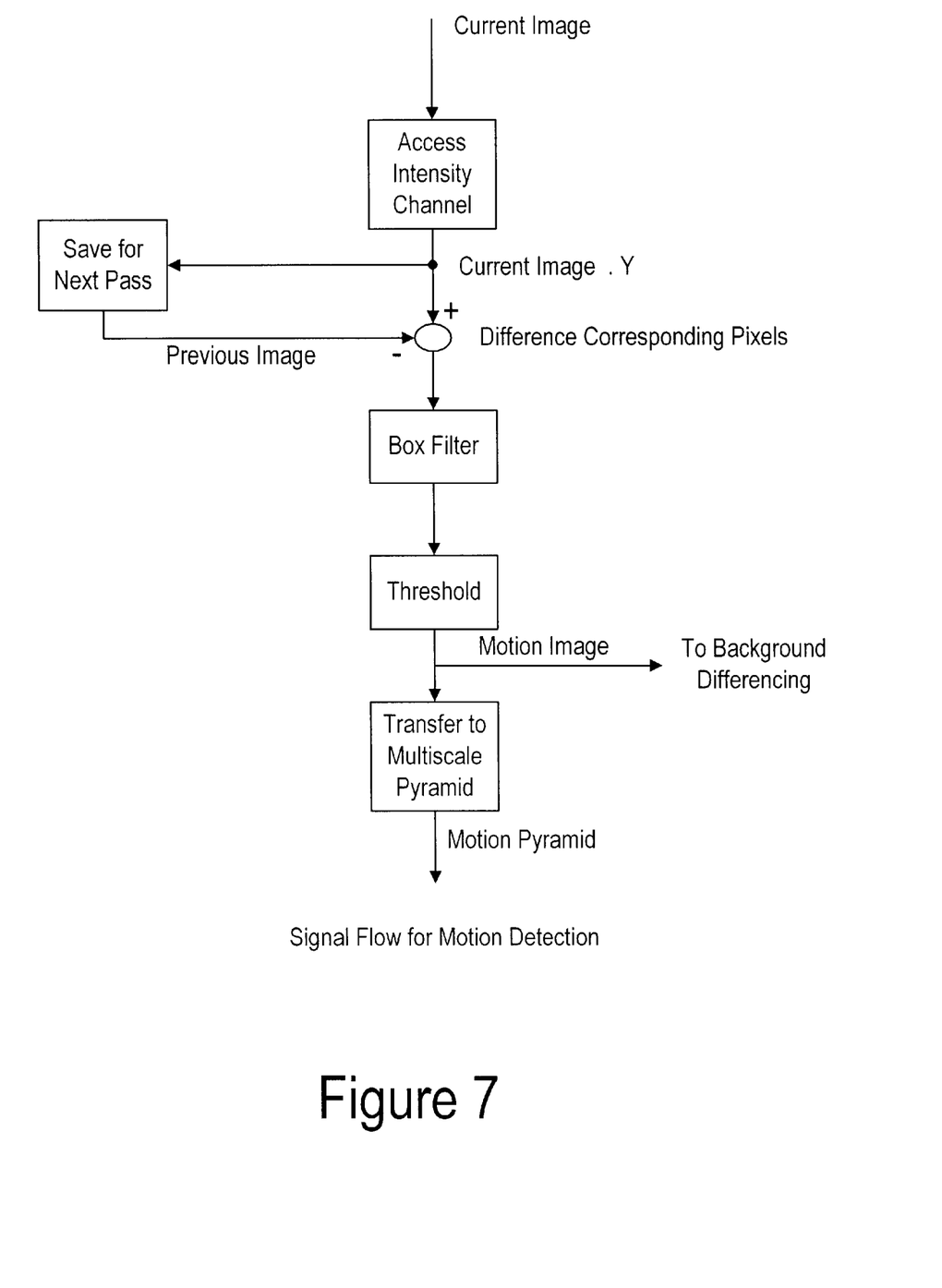
FIG. 7 is a diagram of the signal flow for motion detection.

FIG. 7 illustrates the signal flow for motion detection. To support both motion detection and background differencing, the algorithm computes the absolute value of the difference between corresponding pixels of the Y channel of currentImage and previousImage, an 8-bit image which stores the Y channel of image from the previous pass. The results are stored in an 8-bit image called motionImage. (On the initial pass, motionImage is simply set to all zeros.) After computing the difference, the Y channel of currentImage is copied to previousImage. A box filter is applied to motionImage to fill in holes which result from areas of the face that did not change significantly from frame to frame.

A box filter is a neighborhood averaging method (cf. p. 155, John C. Russ, The Image Processing Handbook, Second Edition, CRC Press, Boca Raton, Fla.((1995) that modifies an image by replacing each pixel value with the average of all pixels in a rectangle (box) surrounding it. The preferred embodiment uses a 5 by 5 box.

To eliminate spurious noise, a threshold operation is applied to motionImage. In other words, any pixel below a specified threshold is set to zero and any pixel above the threshold is set to 255. The preferred embodiment uses a threshold of 20.

To facilitate later combination with other results, the algorithm builds an image pyramid, called motionPyramid, from motionImage. This pyramid has the same number of layers and dimensions as correlationPyramid. The same averaging scheme used to build inputPyramid (described above) is used to build motionPyramid from motionImage. The result of these operations is an "image" pyramid, motionpyramid, where each pixel in the pyramid is a number between zero and 255. The value indicates how much motion is near the corresponding point in the incoming image. A value of zero indicates that there is no significant motion nearby.

Background Differencing

Figure 9:
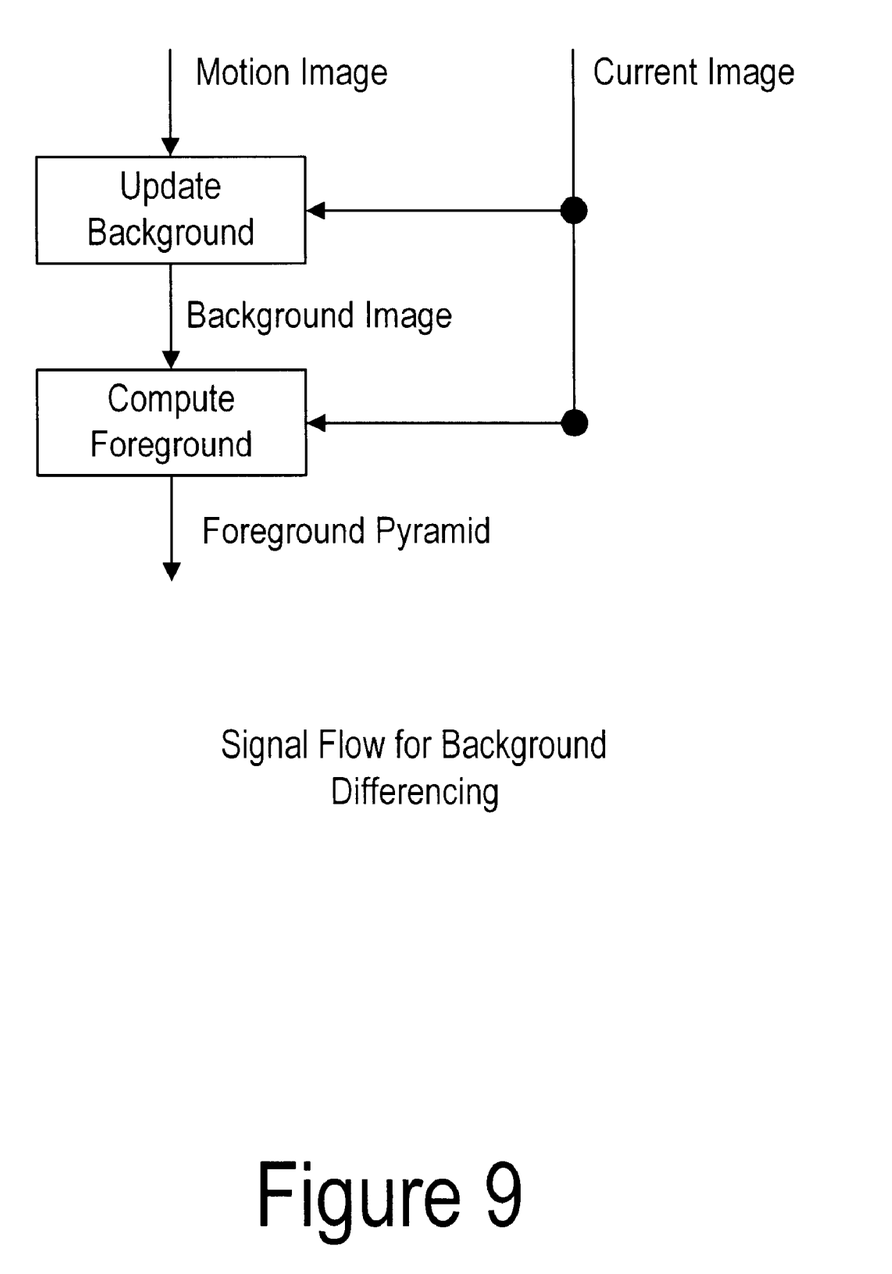
FIG. 9 is a diagram of the signal flow for background imaging.
Figure 10:
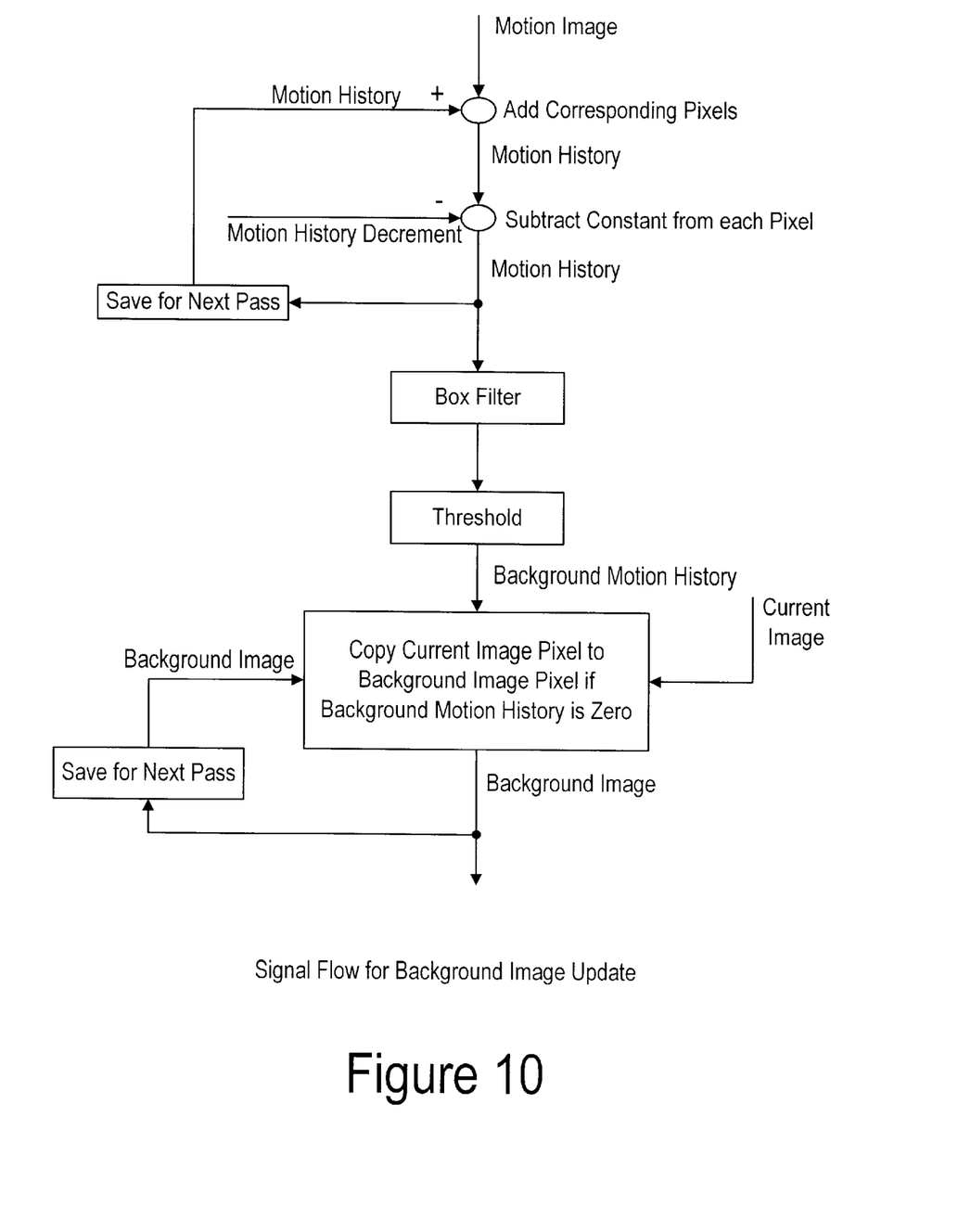
FIG. 10 is a diagram of the signal flow for updating a background image.

The signal flow for background differencing is shown in FIG. 9. As shown in this illustration, background differencing consists of two subprocesses: updating the background and computing the foreground. The signal flow for these background updating is shown in FIG. 10. To update the background, the algorithm firsts computes a motionHistory image. This is an 8-bit image where each pixel value indicates how long it has been since there was motion at that location. The motionHistory image is initialized to zero at program startup. On each pass, motionImage is added to it, using saturation arithmetic. (Saturation arithmetic avoids overflow and underflow in integer operations.

In the case of 8-bit unsigned integers, saturation arithmetic limits the result to be no larger than 255 and no smaller than zero. For example, if 150 and 130 are added, the result is limited to 255. Without saturation arithmetic, adding 150 and 130 would produce overflow and the result would be 24. The memory of the motion is decayed by decrementing each pixel of motionHistory by a value of motionHistoryDecrement once every motionHistorySkip frames. The amount and frequency of the decrement determines how fast the motion history will decay; a larger value of motionHistoryDecrement and a smaller value of motionHistorySkip produces a faster decay. In the preferred embodiment, motionHistoryDecrement is set to one and motionHistorySkip is set to four, which means that the motion history will decay to zero after 1020 frames (68 seconds). This means motion more than 68 seconds ago ceases to influence the algorithm.

To update the background image, the algorithm copies motionHistory into another 8-bit image, backgroundMotionHistory, which is then blurred using a box filter. The preferred embodiment uses a 20 by 20 box filter. Then a threshold operation (with a threshold of one) is applied to set all pixels of backgroundMotionHistory to 255 unless there has been no motion near them during the decay period. If a pixel of backgroundMotionHistory is zero, it indicates that there has been no motion near it for a significant amount of time. In the preferred embodiment, a pixel in backgroundMotionHistory will be zero only if there has been no motion within 10 pixels of it during the last 68 seconds. In this case, all three channels of the pixel at this location in currentImage are copied into the 8-bit YUV image, backgroundImage.

Figure 11:
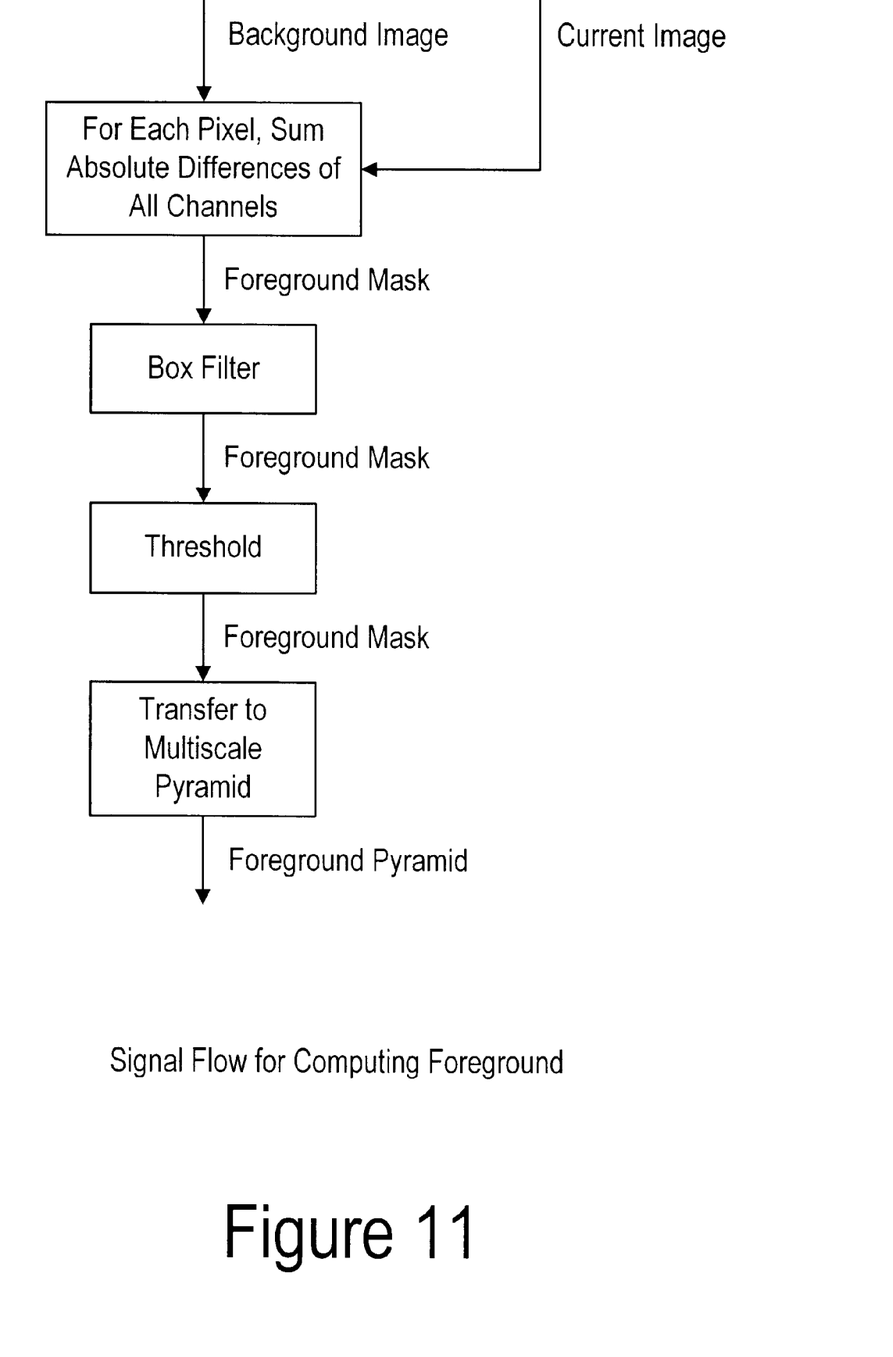
FIG. 11 is a diagram of the signal flow for computing a foreground image.

Next, the foreground image is computed as illustrated in FIG. 11. For each pixel in currentImage, the absolute value of the difference of each channel (Y, U, and V) with the corresponding channel of backgroundImage is computed and they are all summed to produce a total absolute difference. As before, saturation arithmetic is used to avoid overflow problems. These results are stored in the corresponding pixel location of an image called foregroundMask.

Next, a 10 by 10 box filter is applied to foregroundMask to smooth out any noise effects. Then, a threshold operation is applied to foregroundMask. As a result of these operations, each pixel in the resulting image, foregroundMask, will be set to 255 if there is any significant difference between backgroundImage and currentImage within 10 pixels of that location, and will be set to 0 otherwise.

The preferred embodiment uses a threshold of 20 to establish what is a significant difference. To facilitate later combination with other results, the algorithm builds an image pyramid, called foregroundPyramid, from foregroundMask. This pyramid has the same number of layers and dimensions as correlationPyramid. The same averaging scheme used to build inputPyramid (described above) is used to build foregroundPyramid from foregroundMask. The result of these calculations is an "image" pyramid, foregroundPyramid, where each pixel is a number between zero and 255. The value indicates how many foreground (non-background) pixels are near the corresponding point in the incoming image. A value of zero indicates that only background pixels are nearby.

Color Analysis

Figure 12:
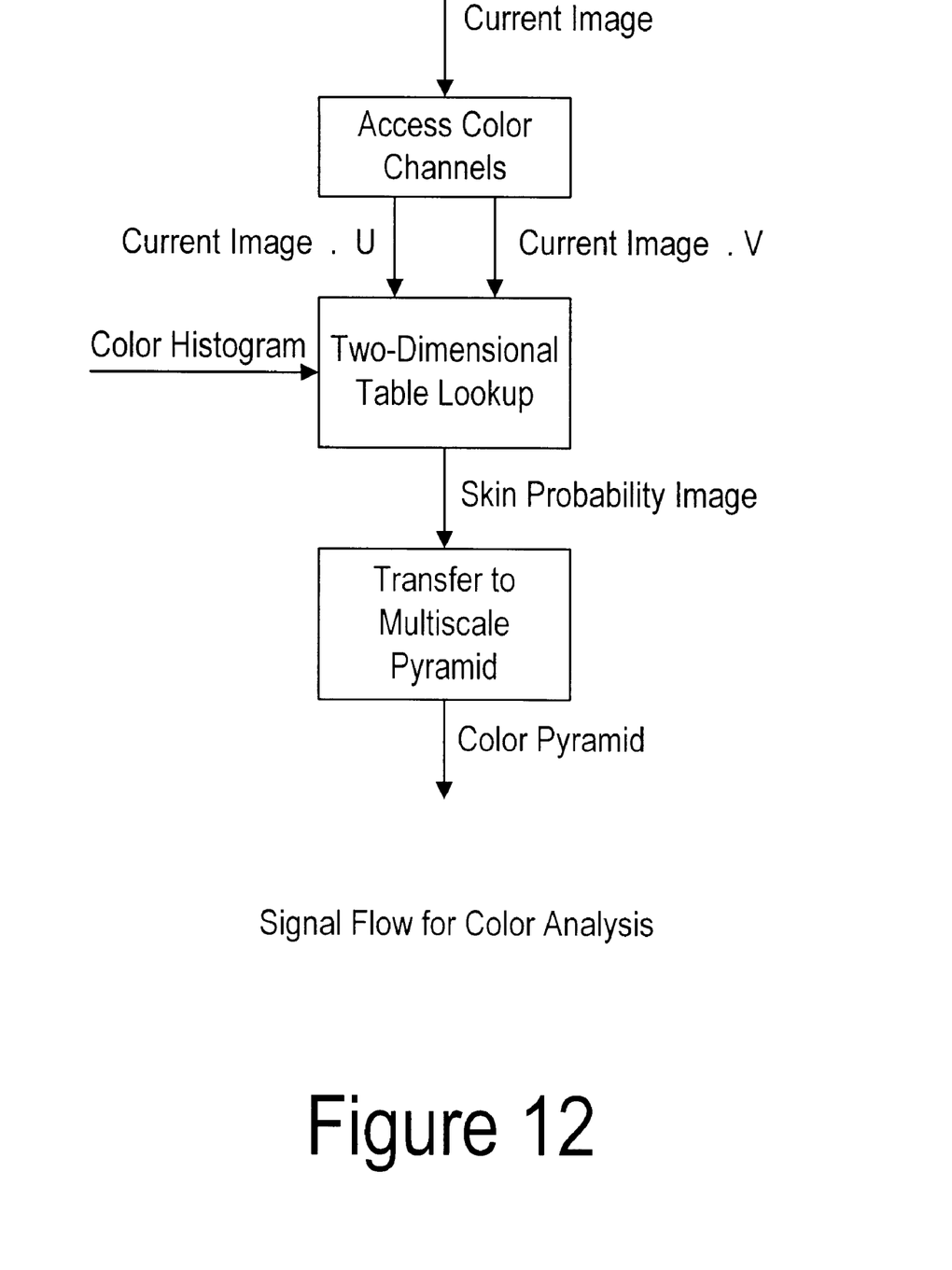
FIG. 12 is a diagram of the signal flow for color analysis.

Performing color analysis involves determining for each pixel in the current image the likelihood that it is the color of human skin. FIG. 12 illustrates the process. Since only the U and V channels in currentImage contain color information, only these channels need to be examined. In this implementation, the 8-bit values for U and V are used to index into a 256 by 256 array to look up the likelihood that the detected combination of U and V represents skin. This lookup table, which is called colorHistogram, is represented by an 8-bit-deep, 256 by 256 image. For each pixel in currentImage, its U value is used as the row index and its V value is used as the column index to look up the likelihood that the pixel represents skin. This likelihood, which is represented by a number between zero and 255, is then placed in the corresponding pixel location of the result, skinProbabilityImage. Once again, to facilitate later combination with other results, the algorithm builds an image pyramid, called in this case colorPyramid, from motionImage. The same averaging scheme used to build inputPyramid (described above) is used to build colorPyramid from skinProbabilityImage. This pyramid has the same number of layers and dimensions as correlationPyramid. The result of these operations is an "image" pyramid, colorPyramid, where each pixel is a number between zero and 255. The value indicates how much skin color is near the corresponding point in the incoming image. A value of zero indicates that there is no skin color nearby.

The lookup table for skin probability, colorHistogram, can be set to a default table or can be "trained" during use, i.e. the computer can be trained to assign a higher probability to sensed values which are close to the skin tones of the computer's regular user or users. A menu selection allows the user to bring up a window showing the live video. The user can then click on an area of skin in the image. The values of U and V, call them $u_r$ and $v_r$, are extracted from the pixel that was clicked on and used to modify the lookup table by adding $\exp\{-[(u-u_r)^2+(v-v_r)^2]/(2*d^2)\}$ to the value in the corresponding (u, v) location of the table using saturation arithmetic. The assumption is that colors near the color of the selected point are like to also be skin. A Gaussian form is used, somewhat arbitrarily, to express this assumption. In the preferred embodiment, the value of d is chosen to be 2.

Combination of Results

Figure 13:
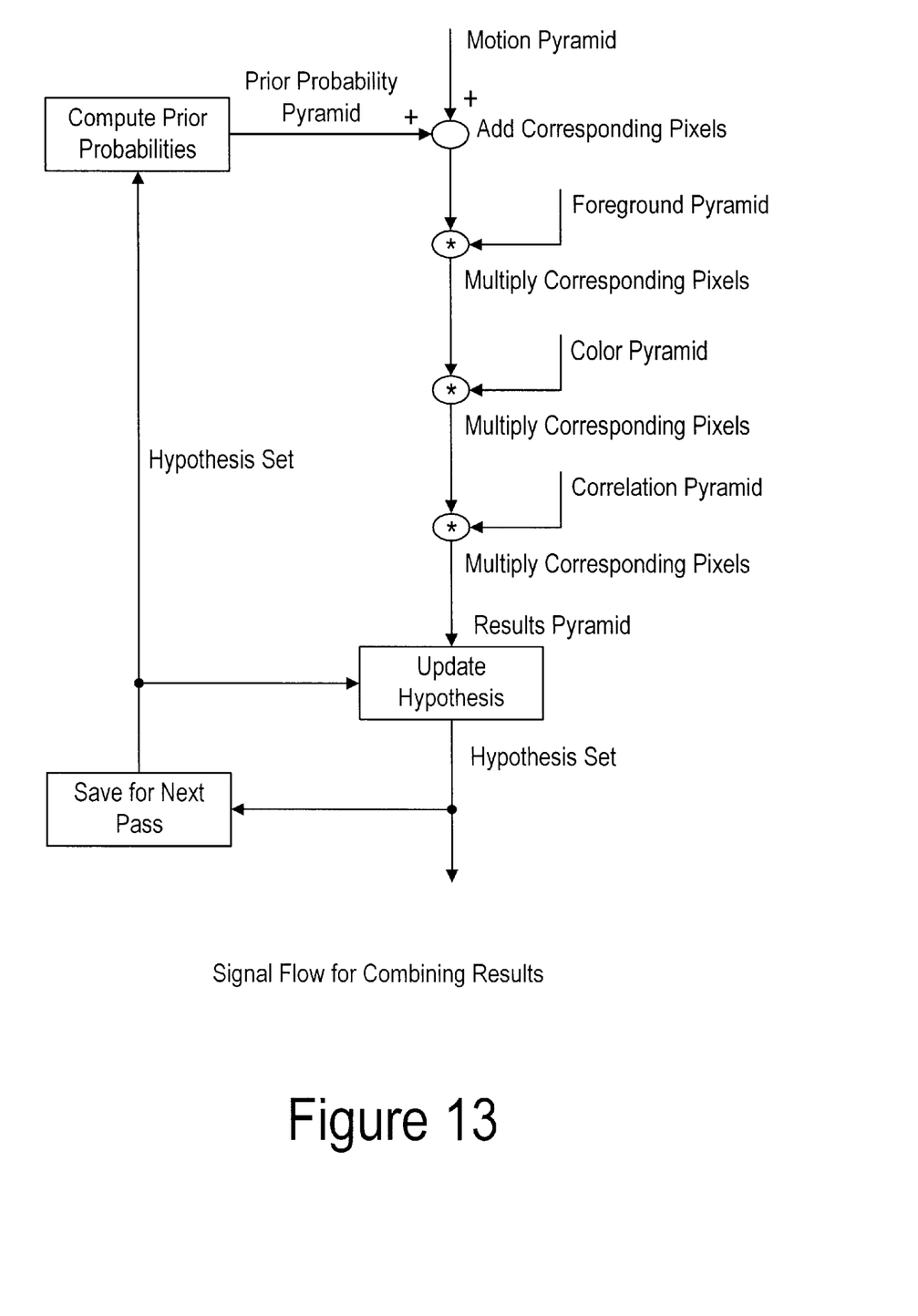
FIG. 13 is a diagram of the signal flow for combining results of the preceding steps.

FIG. 13 shows the method used to combine all of the previous results. The algorithm combines the quantities calculated in the previous steps in a fairly simple manner and stores the results in a pyramid, resultsPyramid, which is the same size as all of the others. This pyramid is searched for likely face detections, which are stored in a set of hypotheses. Each hypothesis contains a location, a scale, and a probability number. The probability of having detected a face is taken be the largest of these probability numbers. Since the frame rate of processing is relatively high, if a face was found in the previous frame, it is likely that a face will be found at a nearby location and scale in the current frame. Therefore, there is value in carrying information from one pass to the next. This is done by means of a prior probability pyramid, priorPyramid. This pyramid has the same number of layers and the same dimensions as all of the other pyramids. A pixel in a layer of this pyramid represents the probability that a face may be at the corresponding location and scale based only on what was found in the previous frame. The method for computing the pixel values of this pyramid will be explained below, after the combination method is described.

The first step in the combination process is to add corresponding pixels of priorPyramid and motionPyramid and to store the result in the corresponding pixel of resultsPyramid. At this point, a pixel in resultsPyramid represents the probability that there is a face at that particular location and scale based having either seen a face nearby on the last pass or on having seen nearby motion on this pass.

Next, corresponding pixels in resultsPyramid, colorPyramid, and correlationPyramid, are all multiplied together and stored back in resultsPyramid. After this operation, a pixel in resultsPyramid represents the probability that a face is at that location and scale, based on all available information. Since the values are stored as 8-bit unsigned integers, they range from zero to 255. A value near 255 represents a high probability that there is a face at the corresponding location and scale in the incoming image.

This method of combination reduces the number of false matches. To indicate the presence of a face at a particular location and scale, there must be (1) either significant motion near the location or a previous sighting of a face at that location and scale, (2) significant difference from the background (pixels that have not changed for 68 seconds), (3) a significant amount of skin color near the location, and (4) a large positive correlation with the face template.

At this point, the algorithm could find all faces in the image by exhaustively searching resultsPyramid for all locations that represent high probabilities. However, since an exhaustive search would be very expensive, a randomized search method is used. To implement the randomized search, a number of hypotheses are maintained from pass to pass. Each hypothesis has a location and scale and will be assigned a probability number representing the likelihood that there is a face at this location and scale. At program startup, the location and scale values are chosen randomly and the probability is set to zero. At the end of each pass, these numbers are updated as follows. The algorithm searches resultsPyramid for a maximum in a limited neighborhood around the location and scale that the hypothesis had on the last pass. If this maximum, which represents the probability of a face, is above a threshold (typically 0.6) then the hypothesis takes on the location and scale where this maximum was found and the probability is retained. Otherwise, the new location and scale for the hypothesis are chosen randomly and the probability is set to zero. Because the algorithm operates at a relatively high frame rate (typically 15 frames per second) and a fairly large number of hypotheses are used (typically 20 or more), the algorithm can locate a face after only a few frames of video. This approach allows the algorithm the flexibility to locate several faces in the image with a reasonably small computational load.

At the end of the pass, the hypotheses with non-zero probabilities are used to compute the prior probability pyramid for the next pass. First, all pixels in priorPyramid are set to zero. Then for each of these hypotheses, a probability distribution is added to priorPyramid around the location and scale of that hypothesis. In the preferred embodiment, a Gaussian distribution is used.

The methods described here improve on the current state-of-the-art because they utilize real-time algorithms for locating faces in live video. Other real-time algorithms that have been used for camera control and switching are inferior because they rely on simple techniques, such as motion detection, that cannot reliably locate only the face. This is especially important for desktop video conferencing because both the transmission bandwidth and the display area at the receiver are limited. In the collaboration and communication situations supported by desktop videoconferencing, the users care most about facial expressions, and available resources should be devoted to producing high-quality face images.

Various changes and modifications are possible within the scope of the inventive concept, as will be apparent to those active in the face recognition and video conferencing arts. For example, features of one embodiment may be combined with features of another embodiment. Therefore, the present invention should not be interpreted as limited to the particular embodiments described above, but rather is defined by the following claims.

What is claimed is:

1. A method of conducting a video conference among multiple participants, each at a location equipped with a camera and a display, respective locations being interconnected by a transmission network having finite bandwidth, comprising the steps of:

generating in each camera an image defined within a frame, evaluating an image from said camera and automatically determining a location, within said image, of each face, and a relative size of said face within said image;

automatically adjusting camera pointing direction and zoom, based upon a result of said face location determining step;

automatically adjusting size of said face to substantially fill a frame generated by said camera;

automatically optimizing brightness and contrast of a resulting image of said face, according to predetermined criteria;

transmitting said optimized image to another participant in said video conference;

and further comprising the steps of pointing multiple cameras at a face, evaluating resulting images from said multiple cameras according to predetermined criteria, and selecting a best one of said resulting images for transmission to said other participant.

2. The method of claim 1, further comprising the step of automatically optimizing color balance of said resulting image of said face.

3. The method of claim 1, further comprising the steps of periodically re-evaluating which camera is producing said best image, while maintaining a predetermined minimum time interval between changes in camera selection.

4. The method of claim 1, further comprising the steps of locating said face using a wide-angle camera, then pointing a narrow-angle camera at said face.

5. The method of claim 4, further comprising the steps of locating more than one face within a predetermined space using said wide-angle camera, then pointing a respective narrow angle camera at each face located.

* * * * *